United States Patent
Walker et al.

(10) Patent No.: US 12,462,493 B2
(45) Date of Patent: Nov. 4, 2025

(54) DATA PROCESSING APPARATUS AND METHOD

(71) Applicant: Sony Interactive Entertainment Inc., Tokyo (JP)

(72) Inventors: Andrew William Walker, London (GB); Sahin Serdar Kocdemir, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 202 days.

(21) Appl. No.: 18/307,873

(22) Filed: Apr. 27, 2023

(65) Prior Publication Data

US 2023/0360341 A1     Nov. 9, 2023

(30) Foreign Application Priority Data

May 4, 2022  (GB) ..................................... 2206484

(51) Int. Cl.
| | | |
|---|---|---|
| G06T 19/00 | (2011.01) | |
| G06T 7/11 | (2017.01) | |
| G06V 10/20 | (2022.01) | |

(52) U.S. Cl.
CPC ............. G06T 19/006 (2013.01); G06T 7/11 (2017.01); G06V 10/255 (2022.01)

(58) Field of Classification Search
None
See application file for complete search history.

(56) References Cited

U.S. PATENT DOCUMENTS

| | | | |
|---|---|---|---|
| 2019/0041651 A1 | 2/2019 | Kiemele | |
| 2019/0043267 A1* | 2/2019 | Anderson | ............... G06F 3/011 |
| 2019/0217198 A1 | 7/2019 | Clark | |
| 2020/0238177 A1 | 7/2020 | Black | |
| 2021/0201028 A1* | 7/2021 | Clark | ..................... G06V 20/20 |

OTHER PUBLICATIONS

Combined Search and Examination Report for corresponding GB Application No. 2206484.4, 7 pages, dated Nov. 4, 2022.

* cited by examiner

*Primary Examiner* — Tapas Mazumder
(74) *Attorney, Agent, or Firm* — Fish & Richardson P.C.

(57) ABSTRACT

A data processing apparatus includes circuitry configured to: receive an image of a user in an environment; determine a region of the environment in the image in which motion of the user is expected, the motion of the user being associated with interactive content experienced by the user; identify one or more attributes of a detected object in the image, a portion of the detected object being within the determined region of the environment; determine a predetermined process associated with the one or more identified attributes; and perform the predetermined process.

8 Claims, 8 Drawing Sheets

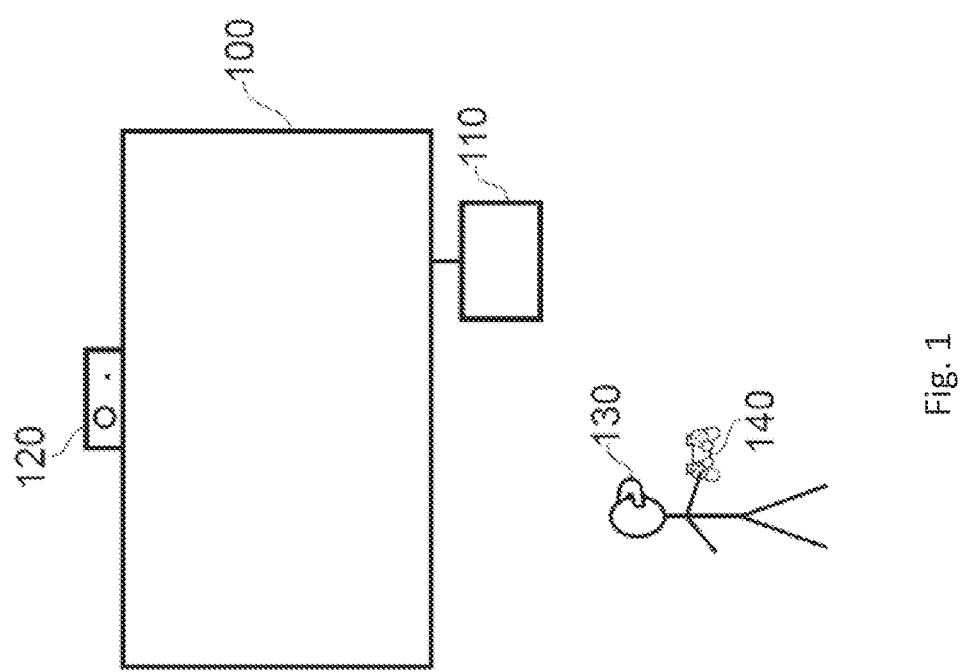

| Detected Object | Characteristic(s) | Action(s) |
|---|---|---|
| Vase | Fragile | Recommend remove |
| Table | Hard | Recommend remove |
| Couch | Soft and Heavy | None |
| Cushion | Soft and Light | Incorporate |

Fig. 5

| Detected Object | Characteristic(s) | Action(s) |
|---|---|---|
| Vase | Fragile | Recommend remove |
| Packaging | Soft and Light | Incorporate |
| Table | Hard | Recommend remove |
| Couch | Soft and Heavy | None |
| Cushion | Soft and Light | Incorporate |

Fig. 7

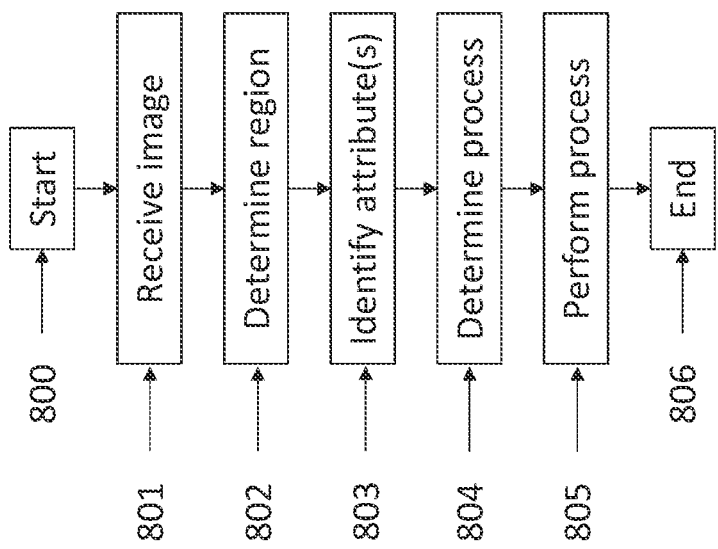

DATA PROCESSING APPARATUS AND METHOD

BACKGROUND

Field of the Disclosure

This disclosure relates to a data processing apparatus and method.

Description of the Related Art

The "background" description provided is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Interactive content such as video games are becoming increasingly sophisticated. In particular, the variety of ways in which a user can interact with the content has increased. For example, a user is now no longer limited to interacting with a video game using a buttons or joysticks on a game controller (although this remains a desirable way for a user to control many video games). Rather, the user's head, hands or even their whole body may be tracked (e.g. in a real time video image captured of the user) as they move around. The user's tracked movements are then used to control the video game. For example, the movements of the user may be mimicked by a character in the video game. This can provide a more interesting, more accessible and higher quality user experience. This may especially be the case when the user experiences content via a head-mountable display (HMD) such as the PlayStation VR® series of products.

A problem, however, is that a user will usually be interacting with such content in a room containing other objects. For example, the user may set up a games console, HMD and camera in a lounge or bedroom. As the user moves around the room to interact with the content, they may accidently collide with other objects in the room, potentially causing injury to the user and/or damage to the objects. It may also be the case that certain objects in the room might be appropriate for use by the user to enhance their experience in interacting with the content. There is a desire for the safety of the user, the safety of objects in the room and the quality of the user experience associated with objects in the room to be improved.

SUMMARY

The present disclosure is defined by the claims.

BRIEF DESCRIPTION OF THE DRAWINGS

Non-limiting embodiments and advantages of the present disclosure are explained with reference to the following detailed description taken in conjunction with the accompanying drawings, wherein:

FIG. 1 schematically illustrates an example entertainment system;

FIG. 5 illustrates example attributes of various detectable objects in the captured image;

FIG. 7 illustrates updated example attributes of various detectable objects in the captured image; and FIG. 8 schematically illustrates an example method.

Like reference numerals designate identical or corresponding parts throughout the drawings.

DETAILED DESCRIPTION OF THE EMBODIMENTS

FIG. 1 schematically illustrates an entertainment system suitable for implementing one or more of the embodiments of the present disclosure. Any suitable combination of devices and peripherals may be used to implement embodiments of the present disclosure, rather than being limited only to the configuration shown.

A display device 100 (e.g. a television or monitor), associated with a games console 110, is used to display content to one or more users. A user is someone who interacts with the displayed content, such as a player of a game, or, at least, someone who views the displayed content. A user who views the displayed content without interacting with it may be referred to as a viewer. This content may be a video game, for example, or any other content such as a movie or any other video content. The games console 110 is an example of a content providing device or entertainment device; alternative, or additional, devices may include computers, mobile phones, set-top boxes, and physical media playback devices, for example. In some embodiments the content may be obtained by the display device itself—for instance, via a network connection or a local hard drive.

One or more video and/or audio capture devices (such as the integrated camera and microphone 120) may be provided to capture images and/or audio in the environment of the display device. While shown as a separate unit in FIG. 1, it is considered that such devices may be integrated within one or more other units (such as the display device 100 or the games console 110 in FIG. 1).

In some implementations, an additional or alternative display device such as the head-mountable display (HMD) 130 may be provided. Such a display can be worn on the head of a user, and is operable to provide augmented reality or virtual reality content to a user via a near-eye display screen. A user may be further provided with a controller 140 which enables the user to interact with the games console 110. This may be through the provision of buttons, motion sensors, cameras, microphones, and/or any other suitable method of detecting an input from or action by a user.

Figure 2B:
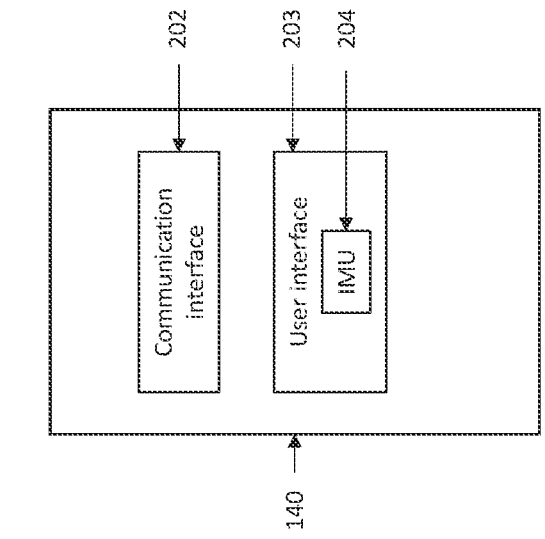
FIGS. 2A and 2B schematically illustrate example components of the entertainment system.
Figure 2A:
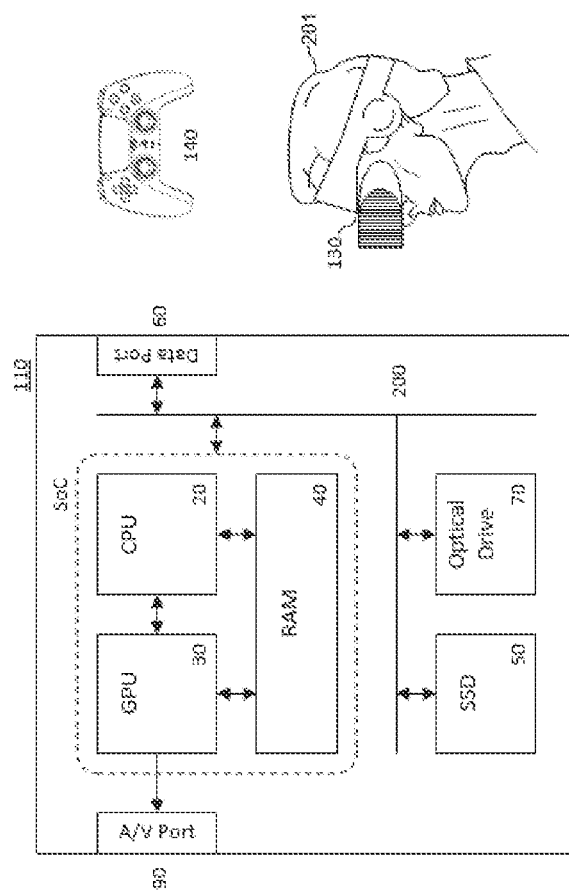

FIG. 2A shows an example of the games console 110. An example is the Sony® PlayStation 5® (PS5).

The games console 110 comprises a central processing unit or CPU 20. This may be a single or multi core processor, for example comprising eight cores as in the PS5. The games console also comprises a graphical processing unit or GPU 30. The GPU can be physically separate to the CPU, or integrated with the CPU as a system on a chip (SoC) as in the PS5.

The games console also comprises random access memory, RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive (SSD), or an internal SSD as in the PS5.

The games console may transmit or receive data via one or more data ports 60, such as a universal serial bus (USB) port, Ethernet® port, WiFi® port, Bluetooth® port or similar, as appropriate. It may also optionally receive data via an optical drive 70.

Interaction with the games console is typically provided using one or more instances of the controller 140, such as the DualSense® handheld controller in the case of the PS5. In an example, communication between each controller 140 and the games console 110 occurs via the data port(s) 60.

Audio/visual outputs from the games console are typically provided through one or more A/V ports 90, or through one or more of the wired or wireless data ports 60. The A/V port(s) 90 may also receive audio/visual signals output by the integrated camera and microphone 120, for example. The microphone is optional and/or may be separate to the camera. Thus, the integrated camera and microphone 120 may instead be a camera only. The camera may capture still and/or video images.

Where components are not integrated, they may be connected as appropriate either by a dedicated data link or via a bus 200.

As explained, examples of a device for displaying images output by the game console 110 are the display device 100 and the HMD 130. The HMD is worn by a user 201. In an example, communication between the display device 100 and the games console 110 occurs via the A/V port(s) 90 and communication between the HMD 130 and the games console 110 occurs via the data port(s) 60.

FIG. 2B shows some example components of the controller 140. The controller comprises a communication interface 202 for transmitting wireless signals to and/or receiving wireless signals from the games console 110 (e.g. via data port(s) 60) and a user interface 203 for receiving input from the user (e.g. comprising one or more of buttons, motion sensor(s), camera(s), microphone(s) or the like, as previously described). In this example, the user interface comprises an inertial measurement unit (IMU) 204 for detecting and measuring motion of the controller 140. The communication interface 202 and user interface 203 (including the IMU 204) are controlled by suitable control circuitry (not shown) of the controller 140.

In many cases, a user of a display device (such as the display device 100 in FIG. 1) or HMD (such as the HMD 130 in FIG. 1) has a reduced awareness of their real-world surroundings due to the level of immersion that the content provides (for instance, through the use of a full-immersion display arrangement and in-ear headphones which means the user has reduced awareness of real world visual or audio stimuli). In such cases it may be desirable to take into account the nature of real life objects surrounding the user to improve the user's safety or their enjoyment of the content. This is especially the case if, for example, the user physically moves their body around in order to interact with the content. In this case, the user's movements are detected by the integrated video camera and microphone 120, the HMD 130 (which may contain an IMU (not shown), for example) and/or the controller 140, for example.

Figure 3:
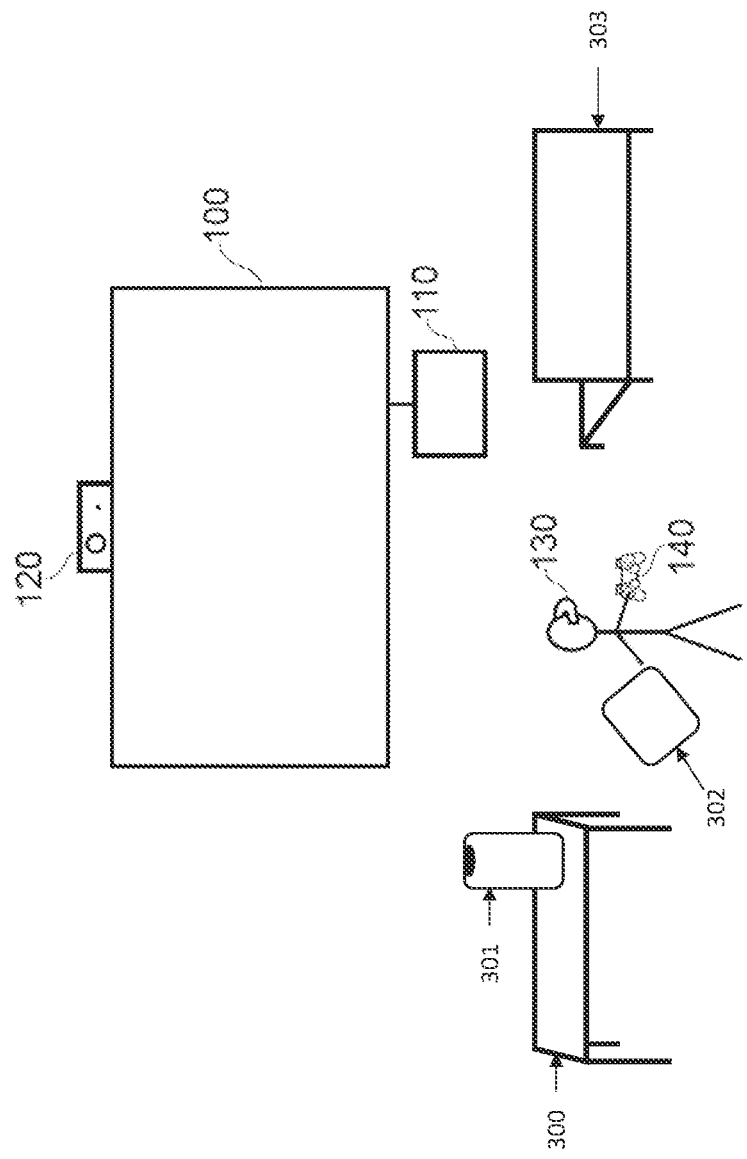
FIG. 3 schematically illustrates a user using the entertainment system in a room environment.

This is illustrated in FIG. 3, which shows a user using the entertainment system of FIG. 1 in a room. The room comprises various items including a table 300, a vase 301, a cushion 302 and a couch 303.

The table 300 may be made of a hard material such as wood and therefore might cause injury to the user if they collide with it whilst immersed in the content.

The vase 301 may be made of a fragile material such as a porcelain and therefore might be damaged if the user collides with it whilst immersed in the content.

The cushion 302 is soft and therefore unlikely to cause injury to the user if it stays close to them whilst they are immersed in the content. Furthermore, the cushion is likely to be light and thus can be easily picked up and carried by the user (as demonstrated in FIG. 3).

The couch 303 is soft and therefore also unlikely to cause injury to the user if it stays close to them whilst they are immersed in the content. Unlike the cushion, however, the couch is likely to be heavy and thus cannot be easily picked up and carried by the user.

This is a simplified example and, in reality, the room may include a larger number and variety of items.

The present technique enables different objects like those of FIG. 3 to be recognised and appropriate action to be taken depending on those objects and their nature. This helps improve the safety and quality of the user's experience.

An example of the present technique is described below. This example is carried out under the control of the CPU 20 of the games console 110, for example.

Figure 4:
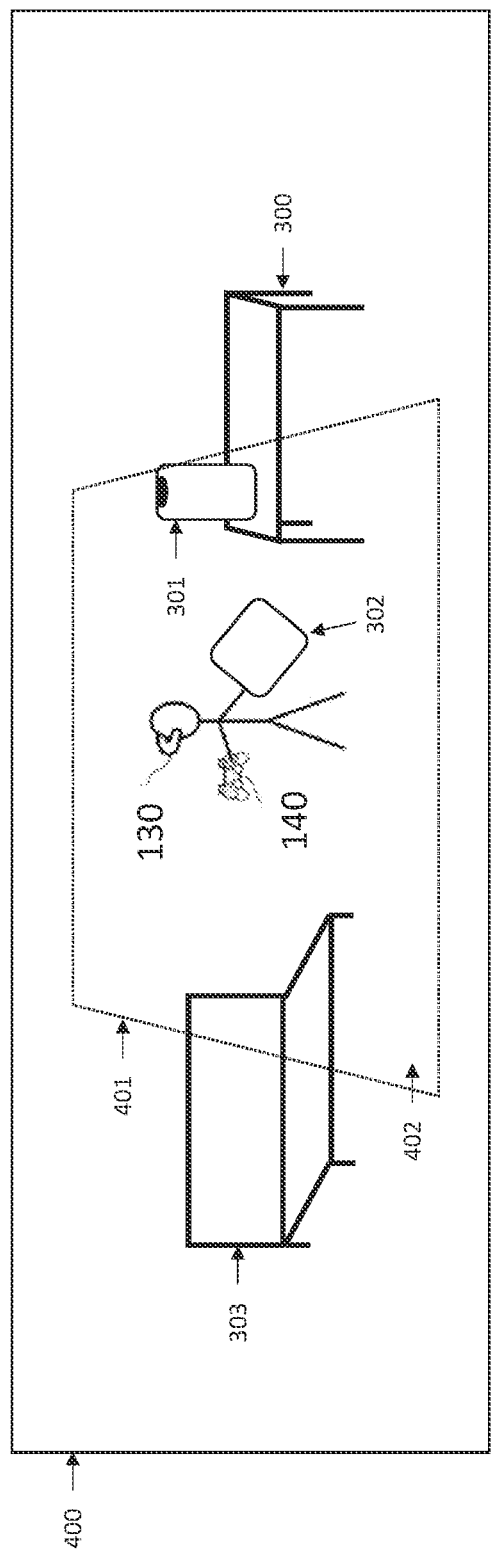
FIG. 4 schematically illustrates a captured image of the room environment.

FIG. 4 shows an image 400 of the room captured by the camera. The image includes the user and each of the objects 300 to 303. The image 400 is a two-dimensional (2D) image and represents a 2D virtual reconstruction of the room. In another example, multiple images of the room may be captured from different perspectives (e.g. using multiple cameras) to generate a three-dimensional (3D) version of the image 400 (e.g. a stereoscopic image) representing a 3D virtual reconstruction of the room. For ease of explanation, examples using a 2D version of image 400 are described. However, it will be appreciated the described principles could also be applied to a 3D version of image 400.

Once the image 400 has been captured, the user is detected in the image using any suitable object detection technique. For example, the image 400 may be segmented and each segment input to a convolutional neural network implemented by the CPU 20 and/or GPU 30 of the games console and/or a server (not shown) connected to the games console over a network (e.g. the internet) via the data port(s) 60. The convolutional neural network may have been previously trained to detect human faces and/or poses. The user will therefore be detected in the segment of the image 400 in which the user appears. This is referred to as the user segment.

Based on the position of the user segment, a boundary 401 is defined around the user segment. The boundary 401 has a predetermined shape and a predetermined size with respect to the size of the image 400 and is centred at the centre of the user segment, for example. The size and shape of the boundary 401 in the image 400 of the room is defined to correspond to the boundaries of a square of a predetermined size (e.g. 3×3 metre square) on the floor of the room in real life, for example. This is based on, for instance, an assumed room size and known characteristics of the lens of the camera (e.g. focal length) which captures the image 400.

The boundary defines a play region 402 for the user. The play region 402 represents a region of the room centred on the user and within which the user is expected to move around as they interact with the content. It can be seen that at least a portion of each of the table 300, vase 301, cushion 302 and couch 303 is present in the play region 402. In the case of some of these objects (in particular, the table and vase), the presence of them in the play region represents a potential problem such as a risk of injury to the player (in the case of the hard table) or a risk of damage to the object (in the case of the fragile vase).

To help address this, in addition to the user being detected in the image 400, each of the objects 300 to 303 in the image 400 are also detected. Again, this is achieved using any suitable object detection technique. For example, the image 400 may again be segmented and each segment input to a convolutional neural network implemented by the CPU 20 and/or GPU 30 of the games console and/or a server (not shown) connected to the games console over a network (e.g. the internet) via the data port(s) 60. The convolutional neural network may have been previously trained to detect various objects which are commonly found in a domestic setting, including tables, vases, cushions and couches. The table 300 will therefore be detected in the segment of the image 400 in which the table 300 appears. This is referred to as the table segment. The vase 301 will be detected in the segment of the image 400 in which the vase 301 appears. This is referred to as the vase segment. The vase cushion will be detected in the segment of the image 400 in which the cushion 302 appears. This is referred to as the cushion segment. The couch 303 will be detected in the segment of the image 400 in which the couch 303 appears. This is referred to as the couch segment.

It is then determined, based on the position in the image of each of the table, vase, cushion and couch segments, whether at least a portion of the table 300, vase 301, cushion 302 or couch 303 are within the play region 402. This is determined, for example, by determining whether at least a portion of each of the table, vase, cushion and couch segments is positioned within the boundary 401. In the example of FIG. 4, it can be seen that at least a portion of each of the table 300, vase 301, cushion 302 or couch 303 are indeed within the play region 402.

For each object with a portion detected in the play region 402, one or more characteristics of that object are looked up. Each detectable object (e.g. each object the convolutional neural network has been trained to detect) is associated with one or more characteristics. The one or more characteristics of each object are indicative of the suitability of that object being present in the play region. Each object may also be associated with one or more actions to be carried out based on its one or more characteristics.

In an example, the characteristic(s) and action(s) of each detectable object are stored in a lookup table like that shown in FIG. 5. The lookup table is formulated in advance (e.g. by a human based on known characteristic(s) of each detectable object and an appropriate action to take if that object is detected in the play region) and stored in the RAM 40 and/or disk 50 of the games console and/or a server (not shown) connected to the games console over a network (e.g. the internet) via the data port(s) 60, for example.

As shown in FIG. 5, the object "Vase" has the characteristic "Fragile" and the action "Recommend remove". This indicates that, if a vase is detected in the play region, it should be removed from the play region because it is fragile and thus may be damaged if the user collides with it.

The object "Table" has the characteristic "Hard" and the action "Recommend remove". This indicates that, if a table is detected in the play region, it should be removed from the play region because it is hard and thus the user may be injured if they collide with it.

The object "Couch" has the characteristics "Soft" and "Heavy" and the action "None". This indicates that, if a couch is detected in the play region, it doesn't need to be removed because it is soft and therefore unlikely to inflict injury on the user if they collide with it. Because it is heavy, however, it cannot be easily moved or lifted by the user for its incorporation in the user's interactive experience. The object "Couch" is thus not associated with any action and thus any couch present in the play region is ignored.

Figure 6:
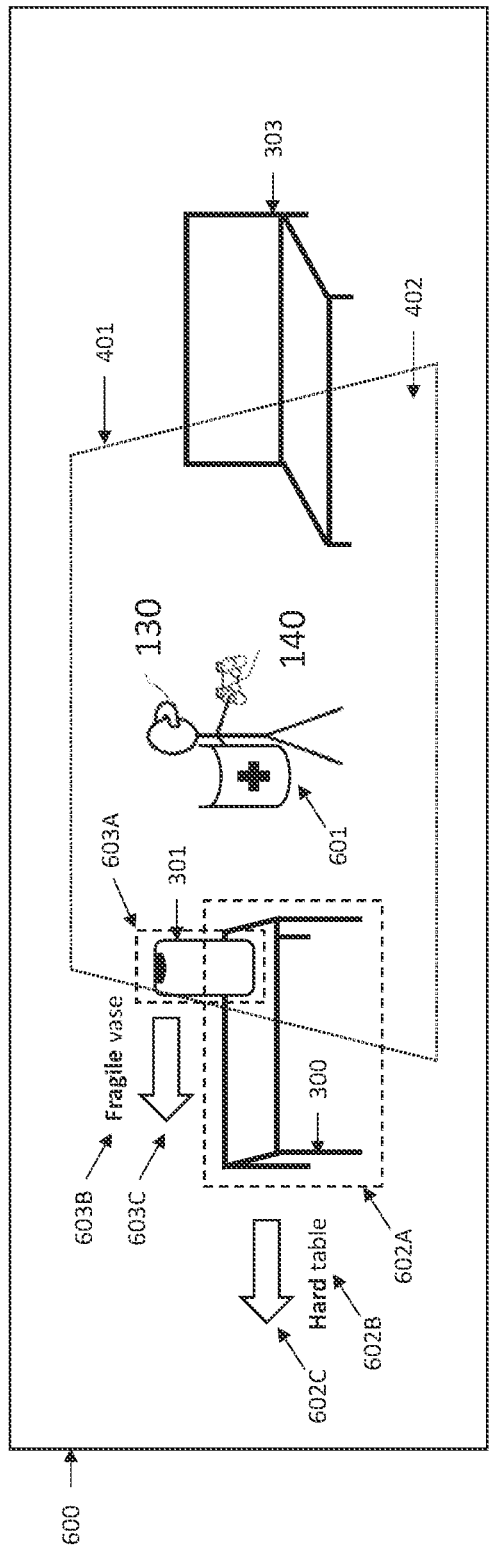
FIG. 6 schematically illustrates a modified version of the captured image.

The object "Cushion" has the characteristics "Soft" and "Light" and the action "Incorporate". This indicates that, if a cushion is in the play region, it doesn't need to be removed because it is soft and therefore unlikely to inflict injury on the user if they collide with it. Furthermore, unlike the object "Couch", because it is light, it can be easily moved or lifted by the user for its incorporation in the user's interactive experience. For example, the cushion may be used as an interactive prop. An example of this is shown in FIG. 6.

Based on the action(s) associated with each detected object, feedback is provided to the user. In the example of FIG. 6, the feedback is provided in the form of a modified version 600 of the image 400. The modified image 600 is generated by the GPU 30, for example, and displayed to the user on the display device 100 and/or HMD 130. In this example, the modified image 600 is based on a mirror image of the image 400 so that, for example, the objects shown on the left- and right-hand sides of the image 600 correspond to the objects on the left- and right-hand sides of the user in the room. This makes it easier for the user to quickly identify objects for which an action is indicated (since the user can use the image 600 like a mirror).

The image 600 again includes the table 300, vase 301 and couch 303. These are not associated with an "Incorporate" action according to the table of FIG. 5 and therefore appear in their original form. On the other hand, since the cushion 302 is associate with an "Incorporate" action, an augmented reality (AR) image 601 has been rendered in place of the original image of the cushion. The user is therefore able to move the cushion around and, in response, the AR image 601 moves to correspond with the movement of the cushion. In this example, the AR image 601 is a shield. However, any different AR image could be used depending, for example, on the interactive content the user is experiencing. For example, the shield of FIG. 6 might be rendered when the content is a mediaeval-style war game. On the other hand, if the content is a tennis game or a music game, a tennis racket or musical instrument may be rendered in place of the original image of the cushion, for example. Once an object associated with an "Incorporate" action has been detected, the AR image can thus be flexibly determined depending on the interactive content.

The image 600 comprises additional AR recommendation images 602 and 603 to indicate the "Recommend remove" actions associated with the table 300 and vase 301. These are rendered in the vicinity of the original images of the table and vase to enable the user easily see it is the table and vase to which the indicated actions relate. The "Recommend remove" action is a recommendation to remove the object concerned from the play region due to the risk of user injury and/or object damage, as discussed.

In this example, the rendered image 602 indicating the "Recommend remove" action for the table 300 comprises a frame 602A surrounding the table 300 in the image (the frame defining the image segment in which the table 300 was detected, for example), a textual message 602B indicating the reason why there is a recommendation to remove the table from the play region (in this case, because the table is hard) and an arrow 602C indicating the recommended direction of movement of the table (in this case, away from the play region 402).

Similarly, the rendered image 603 indicating the "Recommend remove" action for the vase 301 comprises a frame 603A surrounding the vase in the image (the frame defining the image segment in which the vase 301 was detected, for example), a textual message 603B indicating the reason why there is a recommendation to remove the vase from the play region (in this case, because the vase is fragile) and an arrow 603C indicating the recommended direction of movement of the vase (again, away from the play region 402).

Instead of, or in addition to, a visual indicator (such as rendered images 602 or 603) indicating the action, another type of indicator may be used. For example, an audio message saying "Remove fragile vase from play region" (for the vase 301) or "Remove hard table from play region" (for the table 300) may be output (e.g. by a loudspeaker (not shown) of the display device 100 or earphones (not shown) of the HMD 130). The visual and/or audio indicator may be accompanied by haptic feedback (e.g. vibrations of a vibrator (not shown) of the controller 140) to further alert the user to view and/or listen to the output visual and/or audio indicator, for example.

In an example, the image 400 and modified image 600 are video images which are captured and displayed to the user in real time. This enables the user to interact with the real life detected objects in the room and see this interaction reflected in the displayed image 600. For example, this allows the user to cause the displayed AR image 601 to move around in the image 600 by moving around the real life cushion 302 around the room. It also allows the user to determine, for example, when the table 300 and/or vase 301 have been safely moved out of the play region 402, since they are easily able to see the position of each of the table 300 and vase 301 with respect to the indicated boundary 401 in the image 600. In an example, once it is detected an object associated with a "Recommend remove" action has been completely removed from the play region (e.g. since no portion of the image segment in which that object was detected now overlaps with the play region), the AR recommendation images are no longer rendered in the image 600 (e.g. so the user sees only the table 300 and vase 301 in the image and no longer sees the rendered images 602 and 603). This allows the user to determine that the objects concerned have been safely removed from the play region even more quickly and easily.

It will be appreciated this is only an example and there are many potential variations. For example, rather than an object with characteristics "Soft" and "Heavy" like the couch 303 being associated with no action(s), they may be incorporated in the interactive content as a stationary object. For example, an AR image of an object not easily movable by a human, such as a building, mountain or body of water, may be rendered on top of such an object in the image 600. This may improve the interactive experience of the user even though the object remains stationary. Also, rather than an object being associated with a "Recommend remove" action, it may be associated with a "Play region move" action in which, rather than a recommendation to remove the object from the play region being rendered, a recommendation for the user to move to a new position further away from the object and therefore establish a new play region is rendered. This may be appropriate for objects with the characteristics "Hard" and "Heavy", for example, since the hardness of the such an object presents a risk of injury to the user but its heaviness means it is likely to be difficult for the user to move that object out of the current play region.

The detectable objects, characteristic(s) of each object and/or action(s) associated with each object may also be updated over time. In an example, user feedback is used to implement any update(s). User feedback may be obtained at any point, for example during display of the modified image 600. For instance, a virtual "feedback" button (not shown) may be displayed with the modified image 600. When selected by the user (e.g. using controller 140), the user is able to provide feedback on the detected objects to reflect the accuracy of the object recognition and the characteristic(s) and/or action(s) of each detected object. This feedback is then used to improve the accuracy of object recognition and the appropriate action(s) associated with an object when it is detected.

This is exemplified in FIG. 7, which shows the lookup table of FIG. 5 with an additional object "Packaging" which has been added to the lookup table based on user feedback.

In an example, the "Packaging" object may be added when, starting from the previous version of the lookup table in FIG. 5, packaging which is a similar shape to the vase 301 (e.g. because it previously contained an object such as a bottle) but which is made of a non-fragile material such as cardboard is incorrectly identified as the vase 301. An inappropriate recommendation is therefore made to the user to remove the packaging from the play region due to it being fragile.

In response, the user thus opts to provide feedback (e.g. via the above-described virtual "feedback" button). As feedback, the user identifies the object which has been incorrectly identified, provides the correct identification of the object. The user may also indicate characteristic(s) and/or action(s) associated with the object. The correct identification, characteristic(s) and/or action(s) may be provided by the user via a suitable feedback screen (not shown) displayed to the user in response to the user opting to provide feedback. The feedback screen allows the user, for example, to select the object which has been incorrectly identified (e.g. using a cursor controlled by a joystick or directional buttons of the controller 140). In response to the selection, one or more dropdown menus are provided from which the object, characteristic(s) and/or action(s) can be selected by the user.

In an example, the object is an entirely new object which has not been classified before. In this case, the user is able to manually enter a name of the object (e.g. "Packaging") using an on-screen keyboard or the like (with keys of the keyboard being again selected using the controller 140). Dropdown menu(s) are then provided with selectable characteristic(s) and/or action(s) to be associated with the object. In an example, once the characteristic(s) of a newly defined object are selected, the action(s) associated with the object are automatically selected. This may occur due to a predetermined relationship between certain characteristic combinations (each characteristic combination comprising one or more characteristics) and certain action(s). For example, if the user inputs that an object has the characteristic "fragile", then the action "Recommend remove" may be automatically selected for the object. This makes the feedback process quicker and easier for the user (since they do not need to manually select both the characteristic(s) and action(s) using dropdown menu(s) but, rather, only the characteristic(s)). It also helps improve user safety and enjoyment, since it prevents an object unsuitable for the play region (e.g. because it is fragile or hard) being associated with an action which involves it staying in the play region.

In another example, the object may have been previously identified by another user (or by the same user at an earlier time) and thus the name of the object does not need to be manually entered. Rather, the object may be comprised in a list of all detectable objects and is selected via a dropdown menu or the like (not shown). If a relationship between characteristic(s) and/or action(s) and that object has previously been defined (e.g. by another user or by the same user at an earlier time), the user then does not have to manually select the characteristic(s) and/or action(s). Again, this helps improve the speed and ease of the feedback process associated with wrongly identified detected objects.

In the example of FIG. 7, a new detectable object "Packaging" has been added based on user feedback. It has the characteristics "Soft" and "Light" and thus, like the object "Cushion", has the action "Incorporate" associated with it. Rather than a recommendation to remove the object from the play region being provided to the user, the object is thus incorporated as an enhancement to the interactive content (e.g. by replacing it in the modified image 600 with a suitable AR image, such as an AR image which complements the AR image 601 provided for the cushion 302).

In an example, the new detectable object "Packaging" with its characteristics "Soft" and "Light" and its action "Incorporate" may be added to the lookup table in FIG. 5 (to arrive at the lookup table of FIG. 7) in a two-step process.

As a first step, a first user newly defines a detected object in a first captured image as "Packaging". The newly defined detected object may be a wrongly recognised object (e.g. packaging wrongly identified as object "Vase") or an object which has been detected in the image (e.g. based on any suitable object detection technique which recognises objects in an image foreground with respect to an image background) but not recognised. The first user newly defines the detected object by manually typing in "Packaging" and manually selecting the characteristics "Soft" and "Light" from a dropdown menu. There is already a relationship between the characteristics "Soft" and "Light" and the action "Incorporate" and therefore the action "Incorporate" is automatically assigned to the newly defined object "Packaging" without the need for further input from the user. The user then confirms the entered information (by selecting a suitable "Confirm" virtual button (not shown) or the like) and thus this newly defined object is stored as a potential detectable object. Information identifying the potential detectable object is the same as that of each detectable object shown in FIG. 5, for example. For instance, the potential detectable object is defined by the name (e.g. "Packaging"), characteristic(s) (e.g. "Soft" and "Light") and action(s) (e.g. "Incorporate") defined by the first user.

The potential detectable object is selectable in subsequent feedback processes carried out by the first user and/or other users (e.g. if packaging is again wrongly recognised as object "Vase" in subsequently captured images when the first user and/or other users enjoy content on the games console 110). However, since the potential detectable object has only so far been created based on the single instance of feedback of the single first user, it is not yet automatically detectable in the same way as the objects "Vase", "Table", "Couch" and Cushion in the lookup table of FIG. 5.

As a second step, it is determined whether a predetermined number of further feedback instances identifying the newly defined object and confirming the characteristic(s) and/or action(s) identified by the first user have been implemented. In an example, once the newly defined object is stored as a potential detectable object, it is selectable, for instance, in a dropdown menu of a subsequently displayed feedback screen (not shown). Thus, for example, if a second user notices packaging in the room they are in whilst using the games console 110 has been wrongly identified as object "Vase", they may initiate the feedback process and be able to select "Packaging" from a dropdown menu of potential detectable objects. This alleviates the need for the second user to again manually enter "Packaging" (like the first user), thus making the feedback process quicker and easier. It also helps alleviate the same type of object being identified by a plurality of different labels (e.g. "Packaging", "Pack", "Packet", etc.), thereby helping improve the consistency and efficiency of the object recognition process. Once the potential detectable object "Packaging" has been selected, the characteristic(s) and/or action(s) associated with the object (as determined by the first user) are displayed. If the second user agrees with the characteristic(s) and/or action(s), they confirm the feedback (again, by selecting a "Confirm" virtual button (not shown) or the like).

Each further feedback instance identifying the newly defined object and confirming its characteristic(s) and/or action(s) may be referred to as a confirmation process. Once the number of confirmation processes reaches the predetermined number (e.g. 100, 500, 1,000 or 10,000 confirmation processes), it is determined that the potential detectable object with its characteristic(s) and/or action(s) has a sufficient amount of user recognition to be added to the lookup table of FIG. 5. Thus, for example, "Packaging" with characteristics "Soft" and "Light" and action "Incorporate" is added in the updated lookup table of FIG. 7. The potential detectable object "Packaging" thus becomes the detectable object "Packaging" (just like the detectable objects "Vase", "Table", "Couch" and "Cushion").

In an example, once the predetermined number of successful confirmation processes for a potential detectable object has been reached (and thus the potential detectable object becomes a detectable object), the appearance of the detectable object in the image(s) displayed during each successful confirmation process is used to update the object detection technique used for the object detection. This helps enable the newly added detectable object to be reliably recognised in subsequently captured images.

For example, if the object detection technique is a convolutional neural network, an image segment of an image captured during each successful confirmation process containing the newly detectable object "Packaging" is used to train the convolutional neural network to classify such images as containing "Packaging". For instance, if the predetermined number of successful confirmation processes is set as 10,000, then 10,000 image segments of packaging captured during those confirmation processes will be available. These image segments may be used together with, say, 10,000 further images not containing packaging (and classified as such) to train the convolutional neural network to reliably classify subsequently captured images containing packaging as "Packaging" images.

Thus, once "Packaging" is added as a detectable object to the lookup table (as shown in FIG. 7), "Packaging" objects in subsequently captured images can be quickly recognised by the system and the action(s) based on the characteristic(s) associated with those recognised objects can be implemented. The accuracy of the object recognition and of the associated action(s) associated with each recognisable object is thus improved over time based on user feedback.

In an example, if a second user disagrees with the characteristic(s) and/or action(s) associated with a potential detectable object, as initially recorded by the first user, they may change the characteristic(s) and/or action(s) they input as part of their feedback. For example, if a second user selects packaging in a captured image which has been incorrectly identified as the object "Vase" and sees that "Packaging" is presented (e.g. in a dropdown menu) as a potential detectable object, the characteristic(s) of the "Packaging" as selected by the first user are displayed. If the user agrees with these, they may simply confirm the characteristic(s) (by selecting a virtual "Confirm" button (not shown) or the like) and thus the confirmation process is completed and the number of successful confirmation processes is incremented by one. However, if they disagree with the characteristic(s) (e.g. if the first user identified the characteristics as "Soft" and "Heavy", thereby implying related action of "None" rather than a related action of "Incorporate", thus stopping the potentially improved user experience of involving the "Packaging" object in the user's interactive experience), the user may select different characteristic(s) using, for example, one or more dropdown menus (not shown). This is then confirmed by the user, thus creating two competing sets of characteristics for the potential detectable object "Packaging".

There may thus be a plurality of sets of characteristics for a given potential detectable object at any given time. In an example, the set of characteristics which first reaches the predetermined number of successful confirmations is finalised as the characteristic(s) for the potential detectable object when it is added as a detectable object to the lookup table. Thus, for example, if the predetermined number is 10,000 and 10,000 confirmations are reached with the potential detectable object "Packaging" with characteristics "Soft" and "Light" (and thus the action "Incorporate") when there are a fewer number (e.g. around 1,000) confirmations with the potential detectable object "Packaging" with characteristics "Soft" and "Heavy" (and thus the action "None"), the former (with 10,000 confirmations) will be added as a new entry in the lookup table.

The present technique thus enables the variety of recognisable objects (and the associated characteristic(s) and action(s) associated with each recognisable object) to be improved over time based on user feedback, thereby providing a flexible system which helps reduce the risk of user injury and object damage and helps enhance user experience over time.

Although, for simplicity, the mentioned examples of "Table", "Vase", "Cushion", "Couch" and "Packaging" are all different types of object, it is also envisaged that different types of the same object may be separately registered as detectable objects in the lookup table (with these being distinguishable by the system by training the object detection technique, e.g. convolutional neural network, to be able to separately classify multiple types of the same object). For example, there may be multiple types of the object "Vase" with different respective characteristic(s), such as "Vase (porcelain)" with the characteristic "Fragile" and "Vase (plastic)" with the characteristics "Light" and "Non-Fragile". This allows the first type of vase ("Vase (porcelain)") to be associated with one action (e.g. "Recommend remove") and the second type of vase ("Vase (plastic)") to be associated with another action (e.g. "Incorporate).

In an example, additional information available to the system (e.g. to games console 110) may be used to determine the characteristics of a potential detectable object without the need for a user to manually specify those characteristics.

In one example, motion data output by the IMU 204 of the controller 140 may be used in combination with detected images of the controller 140 making contact with another object in the room to determine whether that other object is likely to be soft or hard. This allows, for example, the other object to be assigned the characteristic "Soft" or "Hard" without the need for a user to manually enter such information.

For example, in the case where the controller 140 and table 300 are detected in captured image(s) and the controller 140 appears to contact the table 300 in the image(s) (e.g. by an image segment including the controller 140 overlapping an image segment including the table 300), data indicating a deceleration of the controller at the time the apparent contact in the image(s) is detected is obtained from the IMU 204. If the magnitude of the deceleration (which is higher for a harder deceleration and lower for a softer deceleration) is greater than a first threshold, it is determined that the table 300 is hard. On the other hand, if the magnitude of the deceleration is less than a second threshold (which may be the same or which may be lower than the first threshold), then it is determined the table 300 is soft. The magnitude of the deceleration is measured in metres per second squared $ms^{-2}$, for example.

Since we know from the above examples that the table 300 is hard, the deceleration will be greater than the first threshold and thus it can be automatically determined that the detectable object "Table" should be associated with the characteristic "Hard". On the other hand, when the same process is performed for contact between the controller 140 and, say, the couch 303 (which, from the above examples, we know to be soft), the deceleration will be less than the second threshold and thus it can be automatically determined that the detectable object "Couch" should be associated with the characteristic "Soft".

It will be appreciated this is a simplified example. In reality, there may be more than two levels of hardness (or softness) for any given detectable object as defined by a corresponding number of thresholds.

In another example, whether a detectable object has the characteristic "Light" or "Heavy" may be determined based on whether or not captured image(s) of the room show the user physically lifting the object completely off the ground. If an image is captured of the user lifting the object off the ground, then it is determined the object is "Light" (that is, has a sufficiently low weight for it to be lifted completely off the ground by the user). Thus, for example, the cushion 302 may be automatically associated with the characteristic "Light" based on the fact the user can be seen holding it off the ground in the image 400. On the other hand, the characteristic of the other objects may be set as "Heavy" (or not automatically set at all).

In an example, all objects which are over a predetermined size (as determined by, for example, an image segment including that object having an area in the image which is greater than a predetermined threshold) are assumed to have the characteristic "Heavy" unless it is subsequently detected in a captured image that the object has been completely lifted off the ground by a single user. Thus, for example, if a large cardboard box (not shown) is one of the detectable objects in an image, the initial assumption is that the cardboard box is full and thus has the characteristic "Heavy". The action(s) associated with the box may therefore be "Recommend remove" for safety, for example. However, if an image is then captured of the user lifting the large box completely off the ground (e.g. because the box is empty), the characteristic may be updated to "Light". The action(s) associated with the box may then be changed accordingly (e.g. from "Recommend remove" to "None" or even, for an empty box, to "Incorporate").

In an example, the type of sound detected when one object (e.g. the controller 140 or the feet of the user) is detected as contacting another object (e.g. the table 300, couch 303 or floor of the room) in captured image(s) may indicate one or more characteristics of at least one of the objects. Such a sound may be detected by the microphone of the integrated camera and microphone 120 or by a microphone (not shown) comprised within the controller 140, for example.

For example, in the case where the controller 140 and table 300 are detected in captured image(s) and the controller 140 appears to contact the table 300 in the image(s) (e.g. by an image segment including the controller 140 overlapping an image segment including the table 300), ambient sound at the time the apparent contact in the image(s) is detected is obtained from the microphone. If the loudness of the sound (which is higher for contact between two hard objects and quieter when at least one of the objects is soft) is greater than a first threshold, it is determined that the table 300 is hard. On the other hand, if the loudness of the sound is less than a second threshold (which may be the same or which may be lower than the first threshold), then it is determined the table 300 is soft. The loudness of the sound is measured in decibels dB, for example.

Since we know from the above examples that the table 300 is hard (and the controller 140 is also hard), the loudness of the contact sound between the table and controller will be greater than the first threshold and thus it can be automatically determined that the detectable object "Table" should be associated with the characteristic "Hard". On the other hand, when the same process is performed for contact between the controller 140 and, say, the couch 303 (which, from the above examples, we know to be soft), the loudness of the contact sound will be less than the second threshold and thus it can be automatically determined that the detectable object "Couch" should be associated with the characteristic "Soft".

Again, it will be appreciated this is a simplified example. In reality, there may be more than two levels of hardness (or softness) for any given detectable object as defined by a corresponding number of thresholds.

In an example, the sound detected by the microphone (in particular, the sound loudness) as the user walks around the room may be used to determine whether the floor of the room on which the user is walking is hard (e.g. wooden or tiled) or soft (e.g. carpet). When the floor is hard, each step of the user will be associated with a louder sound (e.g. sound with a loudness greater than the first threshold). On the other hand, when the floor is soft, each step of the user will be associated with a quieter sound (e.g. sound with a loudness less than the second threshold). Each step of the user may be detected via a suitable pose detection algorithm which is able to recognise one or more poses associated with a user completing a step, for example.

The hardness of the floor may affect the action(s) associated with a given detected object in a captured image. For example, for a fragile object like the vase 301, there may be multiple "Recommend remove" actions and the action implemented may depend on the hardness of the floor. For instance, if the floor is determined to be hard (and thus, if the vase is knocked on the floor, there is a high likelihood it will break), the action may be "Highly recommend remove" and, for example, the AR recommendation image (e.g. image 603) may be made more prominent (e.g. a bolder colour and/or flashing or the like). On the other hand, if the floor is determined to be soft (and thus, if the vase is knocked, there is a lower likelihood it will break), the AR recommendation image may be made less prominent (e.g. a less bold colour and/or non-flashing or the like). This allows the recommended actions associated with detected objects in the room to be better tailored to the characteristics of the room (e.g. floor hardness) and to thus be more appropriate to the user. For example, it may reduce the likelihood of more intrusive AR recommendation images associated with, say, the above-mentioned "Highly recommend remove" action being presented to the user (thus potentially interrupting the user's experience) when this is not necessary (e.g. due to a soft floor significantly reducing the risk of the vase 301 breaking it if is knocked onto the floor). The user experience is therefore improved.

In an example, detectable visual characteristics in a captured image of the material from which a detected object is made may be used to determine characteristic(s) of that object. For example, if a detected object appears to be made of a reflective material (with reflective materials such as glass, metal or plastic generally being hard materials which a user would not want to accidently collide with while interacting with content in the play region), it may be determined that the object is "Hard".

In an example, a visual characteristic (e.g. reflective (implying the material hardness is "Hard"), matt (implying the material hardness is unknown), woodgrain (implying the material hardness is "Hard"), etc.) of a detected object is detected by inputting the image segment including the object to a convolutional neural network implemented by the CPU 20 and/or GPU 30 of the games console and/or a server (not shown) connected to the games console over a network (e.g. the internet) via the data port(s) 60. The convolutional neural network may have been previously trained to detect various visual material characteristics which are commonly found in a domestic setting, for example.

In an example, a detectable object recorded in the lookup table may be associated with one or more actions without being also associated with one or more characteristics. This is applicable when, for example, it is always beneficial for that object to be removed from the play region if it is detected in the play region and the reason for this does not have to be explained to the user (e.g. no textual messages like 602B or 603B are required). For example, for games which require a user to stand and move around in the play region, the system may always recommend that a chair detected in the play region is removed from the play region (since the chair is not required and removing it from the play region will increase the space within the play region within which the user can move about, thus improving the user experience).

Although, in the above-described examples, the object detection technique (e.g. to detect which objects identified in the lookup tables of FIG. 5 or FIG. 7 are present in a captured image) is exemplified as utilising a convolutional neural network, this is only an example and any other suitable object detection technique which is able to cause certain objects in a captured image to be detected and recognised may be used. For example, visual characteristics of packaging (e.g. company logo, text as determined using, say, a suitable optical character recognition (OCR) technique or the like) may be used to determine that an object is, indeed packaging. The type of packaging may also be determined. For example, if a drinks manufacturer's logo is detected on an object, it may be determined that the packaging is a can or bottle of drink (with whether the packaging is a can or bottle being further be ascertained by analysing the shape of the object, for example). On the other hand, if a cereal manufacturer's name is detected on an object, it may be determined that the packaging is a box of cereal.

A method according to the present technique is shown in FIG. 8. The method is carried out by circuitry of a data processing apparatus (e.g. the CPU 20 of the games console 110).

The method starts at step 800.

At step 801, an image of a user in an environment (e.g. the image 400 of the user in the room) is received. The image is captured by the camera of the integrated camera and microphone 120, for example.

At step 802, a region of the environment in the image in which motion of the user is expected (e.g. the play region 402) is determined. The motion of the user is associated with interactive content experienced by the user. For example, the user may be playing a video game which is controlled by movements made by the user.

At step 803, one or more attributes of a detected object in the image are identified. A portion of the detected object is within the determined region of the environment. Examples of such a detected object are the table 300, vase 301, cushion 302 and couch 303 mentioned above. An attribute of an object may be a classification of that object (for example, a predetermined name of the object, such as the names "Table", "Vase", "Cushion" and "Couch" of FIG. 5). Alternatively, it may be one or more physical characteristics of that object (for example, the physical characteristics "Fragile", "Soft", "Light", "Hard" and "Heavy" of FIG. 5). The one or more attributes of a detectable object may comprise both a classification and one or more physical characteristics (as exemplified in FIG. 5).

At step 804, a predetermined process associated with the one or more identified attributes is determined. For example, the predetermined process may be to cause a visual indicator (e.g. AR recommendation images 602 and 603) to be displayed informing the user of a recommendation to remove "Hard" or "Fragile" objects from the play region 402. In another example, the predetermined process may be to cause an AR image to replace a "Soft" and "Light" detected object in a version of the captured image which his displayed to the user (for example, the AR image 601 replacing the cushion 302 in the image 600 shown in FIG. 6). In another example, there may always be a recommendation to remove a detected object classified as a "Chair" from the play region, even if the chair does not have any recorded physical characteristics.

At step 805, the predetermined process is performed. The method ends at step 806.

Embodiment(s) of the present disclosure are defined by the following numbered clauses:

1. A data processing apparatus comprising circuitry configured to: receive an image of a user in an environment; determine a region of the environment in the image in which motion of the user is expected, the motion of the user being associated with interactive content experienced by the user; identify one or more attributes of a detected object in the image, a portion of the detected object being within the determined region of the environment; determine a predetermined process associated with the one or more identified attributes; and perform the predetermined process.

2. A data processing apparatus according to clause 1, wherein the attribute one or more attributes comprise a classification of the detected object.

3. A data processing apparatus according to clause 1 or 2, wherein the one or more attributes comprise one or more physical characteristics of the detected object.

4. A data processing apparatus according to any preceding clause, wherein the predetermined process comprises causing an indicator to be output to indicate to the user to remove the detected object from the determined region of the environment.

5. A data processing apparatus according to clause 4, wherein the one or more attributes correspond to one or more physical characteristics of the detected object and the indicator to remove the detected object indicates the one or more physical characteristics of the detected object.

6. A data processing apparatus according to clause 4 or 5, wherein the indicator is a visual indicator.

7. A data processing apparatus according to clause 6, wherein the visual indicator is output with the image of the user in the environment and comprises an augmented reality, AR, image rendered in a vicinity of the detected object in the image of user in the environment.

8. A data processing apparatus according to any preceding clause, wherein the predetermined process comprises causing the image of the user in the environment to be output with an augmented reality, AR, image rendered in place of the detected object in the image of the user in the environment.

9. A data processing apparatus according to any preceding clause, wherein: the detected object is one of a plurality of detectable objects, each detectable object having a respective one or more attributes; and the circuitry is configured to receive information input by the user and update the detectable objects and their respective one or more attributes based on the received information.

10. A data processing method comprising: receiving an image of a user in an environment; determining a region of the environment in the image in which motion of the user is expected, the motion of the user being associated with interactive content experienced by the user; identifying one or more attributes of a detected object in the image, a portion of the detected object being within the determined region of the environment; determining a predetermined process associated with the one or more identified attributes; and performing the predetermined process.

11. A program for controlling a computer to perform a data processing method comprising: receiving an image of a user in an environment; determining a region of the environment in the image in which motion of the user is expected, the motion of the user being associated with interactive content experienced by the user; identifying one or more attributes of a detected object in the image, a portion of the detected object being within the determined region of the environment; determining a predetermined process associated with the one or more identified attributes; and performing the predetermined process.

12. A non-transitory storage medium comprising code components which cause a computer to perform a data processing method comprising: receiving an image of a user in an environment; determining a region of the environment in the image in which motion of the user is expected, the motion of the user being associated with interactive content experienced by the user; identifying one or more attributes of a detected object in the image, a portion of the detected object being within the determined region of the environment; determining a predetermined process associated with the one or more identified attributes; and performing the predetermined process.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a machine-readable medium (in particular, a non-transitory machine-readable medium) carrying such software, such as an optical disk, a magnetic disk, semiconductor memory or the like, is also considered to represent an embodiment of the present disclosure. In particular, the present disclosure should be understood to include a non-transitory storage medium comprising code components which cause a computer to perform any of the disclosed method(s).

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

The invention claimed is:

1. A data processing apparatus comprising circuitry configured to:
   receive an image of a user in an environment;
   determine a region of the environment in the image in which motion of the user is expected, the motion of the user being associated with interactive content experienced by the user;
   identify one or more attributes of a detected object in the image, a portion of the detected object being within the determined region of the environment;
   determine a predetermined process associated with the one or more identified attributes; and
   perform the predetermined process;
   wherein the one or more attributes comprise one or more physical characteristics of the detected object, the one or more physical characteristics indicating whether the detected object is likely to inflict injury on the user during a collision with the user;
   when the one or more physical characteristics indicate the detected object is likely to inflict injury on the user during a collision with the user, the predetermined process comprises causing an indicator to be output to indicate to the user to remove the detected object from the determined region of the environment; and
   when the one or more physical characteristics indicate the detected object is not likely to inflict injury on the user during a collision with the user, the predetermined process comprises causing the image of the user in the environment to be output with an augmented reality, AR, image corresponding to the interactive content rendered in place of the detected object in the image of the user in the environment.

2. The data processing apparatus according to claim 1, wherein the one or more attributes comprise a classification of the detected object.

3. The data processing apparatus according to claim 1, wherein the indicator to remove the detected object indicates the one or more physical characteristics of the detected object.

4. The data processing apparatus according to claim 1, wherein the indicator is a visual indicator.

5. The data processing apparatus according to claim 4, wherein the visual indicator is output with the image of the user in the environment and comprises an augmented reality, AR, image rendered in a vicinity of the detected object in the image of user in the environment.

6. The data processing apparatus according to claim 1, wherein:
   the detected object is one of a plurality of detectable objects, each detectable object having a respective one or more attributes; and
   the circuitry is configured to receive information input by the user and update the detectable objects and their respective one or more attributes based on the received information.

7. A data processing method comprising:
   receiving an image of a user in an environment;
   determining a region of the environment in the image in which motion of the user is expected, the motion of the user being associated with interactive content experienced by the user;
   identifying one or more attributes of a detected object in the image, a portion of the detected object being within the determined region of the environment;
   determining a predetermined process associated with the one or more identified attributes; and
   performing the predetermined process;
   wherein the one or more attributes comprise one or more physical characteristics of the detected object, the one or more physical characteristics indicating whether the detected object is likely to inflict injury on the user during a collision with the user;
   when the one or more physical characteristics indicate the detected object is likely to inflict injury on the user during a collision with the user, the predetermined process comprises causing an indicator to be output to indicate to the user to remove the detected object from the determined region of the environment; and
   when the one or more physical characteristics indicate the detected object is not likely to inflict injury on the user during a collision with the user, the predetermined process comprises causing the image of the user in the environment to be output with an augmented reality, AR, image corresponding to the interactive content rendered in place of the detected object in the image of the user in the environment.

8. A non-transitory storage medium comprising code components which cause a computer to perform a data processing method comprising:
   receiving an image of a user in an environment;
   determining a region of the environment in the image in which motion of the user is expected, the motion of the user being associated with interactive content experienced by the user;
   identifying one or more attributes of a detected object in the image, a portion of the detected object being within the determined region of the environment;
   determining a predetermined process associated with the one or more identified attributes; and performing the predetermined process;

wherein the one or more attributes comprise one or more physical characteristics of the detected object, the one or more physical characteristics indicating whether the detected object is likely to inflict injury on the user during a collision with the user;

when the one or more physical characteristics indicate the detected object is likely to inflict injury on the user during a collision with the user, the predetermined process comprises causing an indicator to be output to indicate to the user to remove the detected object from the determined region of the environment; and when the one or more physical characteristics indicate the detected object is not likely to inflict injury on the user during a collision with the user, the predetermined process comprises causing the image of the user in the environment to be output with an augmented reality, AR, image corresponding to the interactive content rendered in place of the detected object in the image of the user in the environment.

* * * * *